(12) United States Patent
Dhavaria et al.

(10) Patent No.: US 12,540,140 B2
(45) Date of Patent: Feb. 3, 2026

(54) PROCESS FOR THE PREPARATION OF REMIMAZOLAM

(71) Applicant: FRESENIUS KABI ONCOLOGY LIMITED, New Delhi (IN)

(72) Inventors: Sandeep Dhavaria, Gurgaon (IN); Anil Shamraj Bhoyar, Gurgaon (IN); Rohit Kumar, Gurgaon (IN); Chandan Kumar Gupta, Gurgaon (IN); Hemant Kumar Singh, Gurgaon (IN); Nitin Gupta, Gurgaon (IN); Govind Singh, Gurgaon (IN); Walter Cabri, Cassina de' Pecchi (IT)

(73) Assignee: FRESENIUS KABI ONCOLOGY LTD., New Delhi (IN)

( * ) Notice: Subject to any disclaimer, the term of this patent is extended or adjusted under 35 U.S.C. 154(b) by 0 days.

(21) Appl. No.: 18/855,229

(22) PCT Filed: Apr. 6, 2023

(86) PCT No.: PCT/IB2023/053516
§ 371 (c)(1),
(2) Date: Oct. 8, 2024

(87) PCT Pub. No.: WO2023/194945
PCT Pub. Date: Oct. 12, 2023

(65) Prior Publication Data
US 2025/0263414 A1    Aug. 21, 2025

(30) Foreign Application Priority Data
Apr. 8, 2022 (IN) .............................. 202211021182

(51) Int. Cl.
*C07D 471/04* (2006.01)
*C07D 487/04* (2006.01)
(52) U.S. Cl.
CPC ......... *C07D 487/04* (2013.01); *C07D 471/04* (2013.01)
(58) Field of Classification Search
CPC .................................................. C07D 487/04
USPC ....................................................... 540/562
See application file for complete search history.

(56) References Cited

U.S. PATENT DOCUMENTS

| | | | |
|---|---|---|---|
| 7,160,880 B1 * | 1/2007 | Feldman | C07D 401/12 540/509 |
| 9,656,987 B2 | 5/2017 | Kawakami et al. | |
| 9,981,941 B2 | 5/2018 | Kawakami et al. | |
| 10,414,749 B2 | 9/2019 | Kawakami et al. | |
| 2016/0009680 A1 | 1/2016 | Kawakami et al. | |
| 2017/0217925 A1 | 8/2017 | Kawakami et al. | |
| 2018/0141928 A1 | 5/2018 | Kawakami et al. | |

FOREIGN PATENT DOCUMENTS

| | | |
|---|---|---|
| CN | 108 264 499 B | 10/2020 |
| EP | 1 183 243 B1 | 2/2006 |
| WO | 00/69836 A1 | 11/2000 |
| WO | 2008/007071 A1 | 1/2008 |
| WO | 2011/032692 A1 | 3/2011 |
| WO | 2014/136730 A1 | 9/2014 |
| WO | 2018/148361 A1 | 8/2018 |
| WO | 2019/020790 A1 | 1/2019 |

OTHER PUBLICATIONS

Kalcheva et al., "Synthese von 3-(2-Oxopropyl)-Oxazolo [4,5-b]pyridin-2-On und seine Reaktion mit Hydroxylaminhydrochlorid bzw. primären Aminen,", Journal fur Praktische Chemie, Wiley, DE, Band 331, Heft 1: 167-170 (1989). (Synthesis of 3-(2-oxopropyl)-oxazolo[4,5-b]pyridin-2-one and its Reaction with Hydroxylamine Hydrochloride or Primary Amines, *Journal for Practical Chemistry* 331(1): 167-170 (1989)).

(Continued)

*Primary Examiner* — Niloofar Rahmani
(74) *Attorney, Agent, or Firm* — Leydig, Voit & Mayer, Ltd.

(57) ABSTRACT

The present invention relates to an improved process for the preparation of a compound of formula V or a salt thereof, Formula (V) The present invention also provides a process for the preparation of a compound of formula I, used in the synthesis of the compound of formula V, Formula (I) wherein Formula I is Formula Ia, when R is H wherein Formula I is Formula Ib, when R is $CH_2COCH_3$.

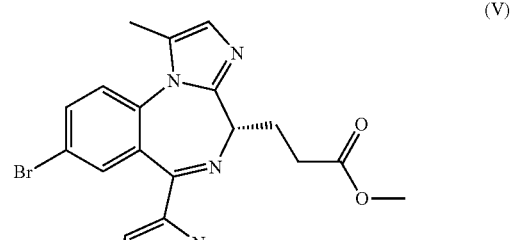

(V)

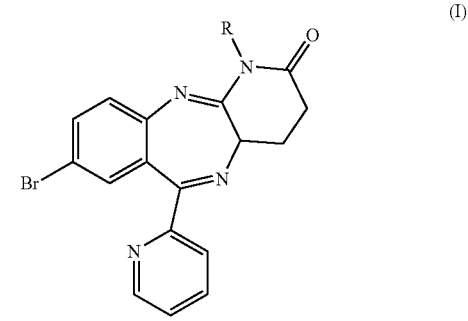

(I)

11 Claims, No Drawings

(56) References Cited

OTHER PUBLICATIONS

International Bureau of WIPO, International Preliminary Report on Patentability in International Application No. PCT/IB2023/053516 (Oct. 8, 2024).
European Patent Office, International Search Report in International Application No. PCT/IB2023/053516 (Jul. 31, 2023).
European Patent Office, Written Opinion in International Application No. PCT/IB2023/053516 (Jul. 31, 2023).

* cited by examiner

PROCESS FOR THE PREPARATION OF REMIMAZOLAM

CROSS REFERENCE TO RELATED PATENT APPLICATION(S)

This patent application is the U.S. national phase of International Application No. PCT/IB2023/053516, filed on 6 Apr. 2023, which claims the benefit of Indian Patent Application number 202211021182, filed on 8 Apr. 2022, which are incorporated by reference herein in their entireties.

FIELD OF THE INVENTION

The present invention relates to an improved process for the preparation of a compound of formula V or a salt thereof,

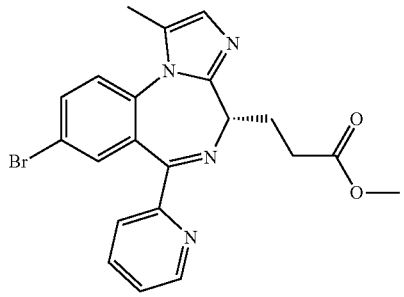

Formula V

The present invention also provides a process for the preparation of a compound of formula I, used in the synthesis of the compound of formula V.

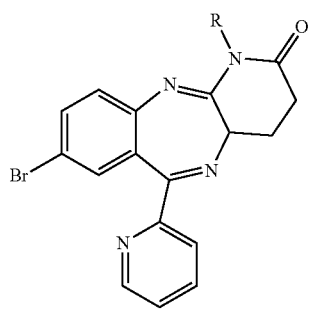

Formula I wherein Formula I is Formula Ia, when R is H wherein Formula I is Formula Ib, when R is CH$_2$COCH$_3$

BACKGROUND OF THE INVENTION

Remimazolam, a benzodiazepine drug, is represented by Formula V.

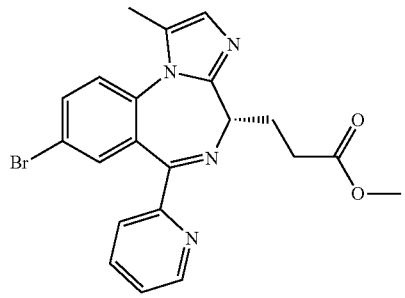

Formula V

Remimazolam besylate (marketed under the trade name BYFAVO®, PAION) is indicated in adults for procedural sedation. Remimazolam besylate is represented by Formula VI,

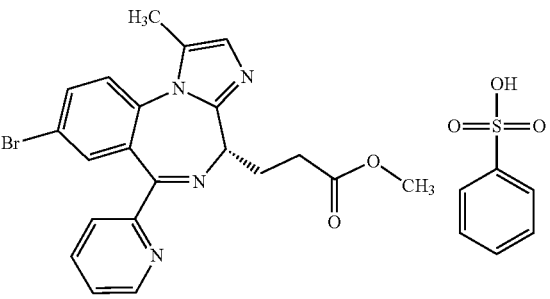

Formula VI

Remimazolam is disclosed in WO 2000/69836 that also provides a process for the preparation of Remimazolam. The process disclosed in WO2000/69836 requires hazardous and expensive reagents and some steps of the process operate at extremely low temperature (−78° C.). This makes the process less suitable for commercial purposes. Moreover, column chromatography and a high number of purification steps, result in low overall yield and insufficient optical purity of Remimazolam.

WO2014/136730 discloses the synthesis of Remimazolam comprising oxidation reaction in presence of 2-azaadamantane-N-oxyl or 2-azaadamantan-2-ol as oxidation catalyst.

WO2011/032692 and WO2019/020790 disclose a synthesis of Remimazolam comprising oxidizing intermediate compounds with Dess-Martin periodinane oxidizing agent. However, the use of costly oxidation catalysts, their potential explosive nature and oxidation reaction makes these processes unfavourable for industrial application.

CN 108264499 also describes a process where unstable, moisture sensitive & non-commercial reagents are used in the synthesis.

WO2018/148361 discloses the preparation of Remimazolam involving an intermediate compound of formula III/IIIa. The process uses non-commercial and costly raw materials such as 2,2-Dimethoxypropan-1-amine. On top, the ketal intermediates formed in the described process are not stable.

From the foregoing, it is apparent that there are various prior arts disclosing different processes of Remimazolam synthesis. They either involve complex oxidation reactions conditions, or expensive or pyrophoric reagents that are unsuitable for commercial aspects. In some cases, the intermediates formed in the prior art processes are isolated by cumbersome work-up procedures using numerous reagents and various steps.

Thus, there remains a need to provide an efficient, simple and industrially viable synthetic process which can overcome the drawbacks of the prior art.

OBJECT OF THE INVENTION

The objective of the present invention is to provide an improved and commercially viable process for the synthesis of Remimazolam.

SUMMARY OF THE INVENTION

In a first aspect, the present invention relates to a process for the preparation of a compound of formula V or a salt thereof,

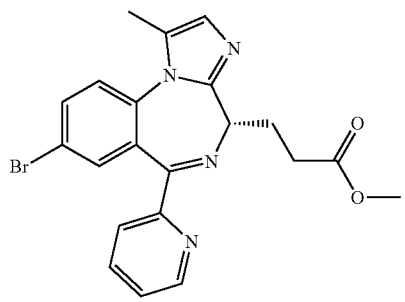

Formula V comprising the steps of
a. reacting a compound of formula IV,

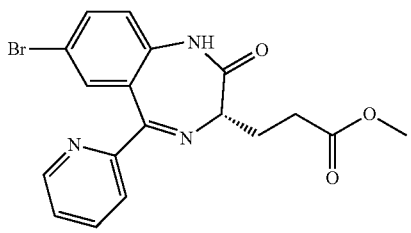

Formula IV with a carbonyl group activating agent and adding an amination agent to obtain a compound of formula Ia,

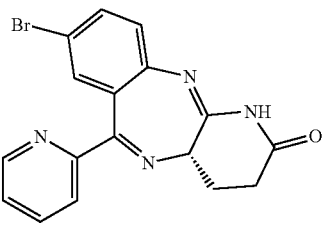

Formula Ia b. converting the compound of formula Ia to the compound of formula V or a salt thereof.

In another aspect, the present invention relates to a process for preparation of a compound of formula Ia, comprising reacting a compound of formula IV,

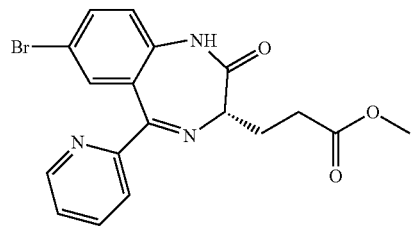

Formula IV with a carbonyl group activating agent and adding an amination agent to obtain a compound of formula Ia.

Another aspect of the invention is to provide a process for the preparation of a compound of formula Ib,

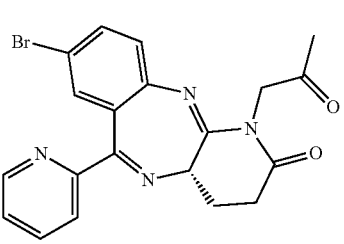

Formula Ib comprising reacting a compound of formula Ia,

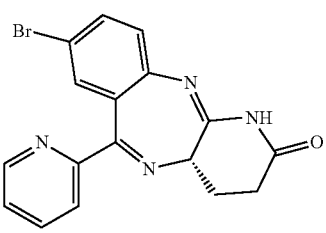

Formula Ia with a compound of formula III,

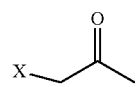

Formula III wherein X=Cl, Br, I, or OH.

In another aspect, the present invention provides a compound of formula I,

Formula I

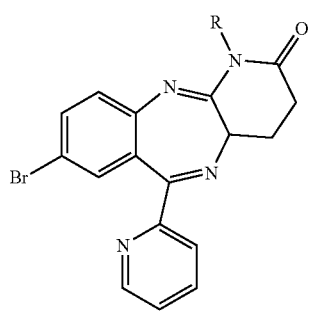

wherein Formula I is Formula Ia, when R is H
wherein Formula I is Formula Ib, when R is CH$_2$COCH$_3$ Another aspect of the invention is to provide a process for the preparation of a compound of formula V or a salt thereof, Formula V

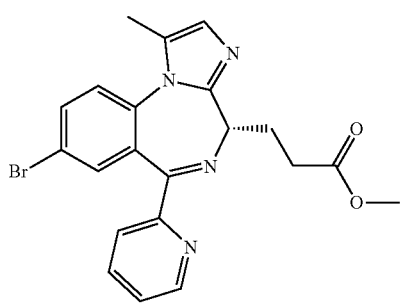

comprising the steps of
a. reacting a compound of formula IV,

Formula IV

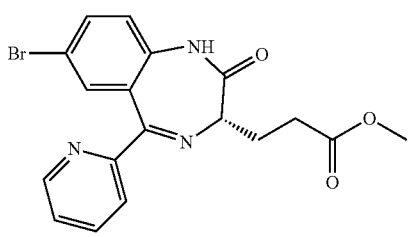

with triflic anhydride and ammonia to obtain a compound of formula Ia,

Formula Ia

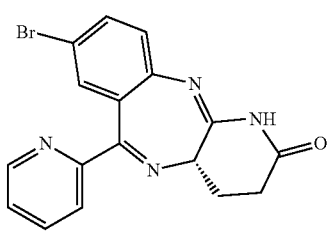

b. reacting the compound of formula Ia, with a compound of formula III,

Formula III

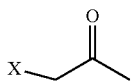

wherein X=Cl, Br, I, or OH in the presence of a base to obtain a compound of formula Ib, Formula Ib c. treating the compound of formula Ib with trimethyl silyl chloride in methanol to obtain the compound of formula V or a salt thereof.

Definitions

The following definitions are used in connection with the present application unless the context indicates otherwise.

The term "carbonyl group activating agent" refers to a chemical compound or a reagent that activates a carbonyl group in a compound to attract nucleophiles more strongly. Examples of carbonyl group activating agent include but are not limited to triflic anhydride, methanesulphonic anhydride, p-toluenesulfonic anhydride, benzenesulphonic anhydride, methanesulfonyl chloride and p-toluenesulphonyl chloride. The preferred carbonyl group activating agent is triflic anhydride.

The term "amination agent" refers to a chemical compound or a reagent which introduces an amine group in a compound. Examples of amination agents include but are not limited to ammonia, ammonium hydroxide, ammonium chloride, ammonium bromide, ammonium iodide, ammonium carbonate, preferably ammonia.

The term "salt" refers to both organic and inorganic salts of a compound. The salt of a compound may be prepared by treating the compound with the corresponding acid selected from the group consisting of mineral acids such as hydrochloric acid, hydrobromic acid and organic acids such as methanesulphonic, ethanesulphonic acid, camphorsulfonic acid, benzene sulfonic acid, 2-naphthalenesulfonic acid, p-toluenesulphonic acid and naphthalene-1,5-disulfonic acid.

DETAILED DESCRIPTION OF THE INVENTION

The present invention relates to a process for the preparation of a compound of formula V or a salt thereof,

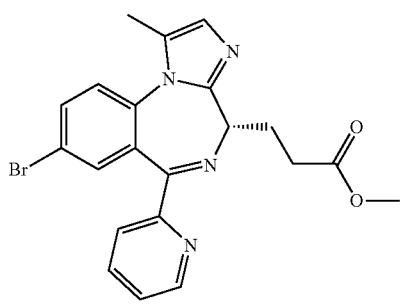

Formula V

In an embodiment, the process comprises a step for the preparation of a compound of formula Ia,

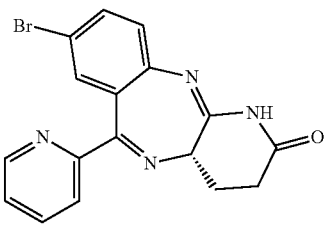

Formula Ia

In one embodiment, the compound of formula Ia is prepared by reacting a compound of formula IV,

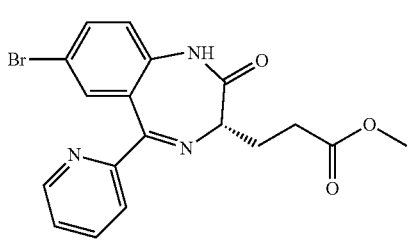

Formula IV with a carbonyl group activating agent and adding an amination agent.

The compound of formula IV used herein in the process may be obtained from commercial sources or prepared by processes known in the art for example, by a process known in WO2000069836.

The carbonyl group activating agent may be selected from the group consisting of triflic anhydride, methanesulphonic anhydride, p-toluenesulfonic anhydride, benzenesulphonic anhydride, methanesulfonyl chloride and p-toluenesulphonyl chloride.

In a preferred embodiment, the compound of formula IV is reacted with the carbonyl group activating agent, triflic anhydride.

Preferably, the reaction of the compound of formula IV with the carbonyl group activating agent is carried out in the presence of a base. In some embodiments, the base is selected from the group consisting of pyridine, 2-bromopyridine, 2-chloropyridine, 2,6-dibromopyridine, 2,6-dichloropyridine or a mixture thereof. Preferably, the base is 2-bromopyridine or 2-chloropyridine.

In a preferred embodiment, the compound of formula IV is reacted with triflic anhydride in the presence of 2-bromopyridine or 2-chloropyridine.

In another preferred embodiment, the compound of formula IV is reacted with triflic anhydride in the presence of 2-chloropyridine The reaction may be carried out in a solvent. The solvent may be selected from the group consisting of aprotic solvents. Preferably, the solvent is selected from dichloromethane, chloroform, acetonitrile, toluene, tetrahydrofuran or a mixture thereof. More preferably, the solvent is dichloromethane.

In one aspect of the invention, the compound of formula IV is reacted with triflic anhydride in the presence of 2-bromopyridine or 2-chloropyridine in dichloromethane, and then an amination agent is added to the resulting reaction mixture.

The amination agent may be selected from the group consisting of ammonia, ammonium hydroxide, ammonium chloride, ammonium bromide, ammonium iodide and ammonium carbonate. In a preferred embodiment, the amination agent is ammonia.

In an embodiment, the addition of the amination agent is provided in a solvent selected from the group consisting of methanol, ethanol, isopropyl alcohol, tetrahydrofuran, dioxane and mixtures thereof. Preferably the solvent is isopropyl alcohol.

In an embodiment, the reaction with a carbonyl group activating agent and an amination agent is carried out at a temperature range of −20° C. to 30° C., e.g., −20° C. to 20° C., −20° C. to 5° C., −15° C. to 0° C., or −15° C. to −5° C.

In a preferred embodiment, the compound of formula IV is reacted with triflic anhydride in the presence of 2-bromopyridine in dichloromethane at −15° C. to −10° C. under stirring for, e.g., about 1-2 hours. More preferably, the reaction mixture is stirred for about 1 hour. To the reaction mixture, ammonia in isopropyl alcohol is added at −15° C. to 5° C., preferably, at −10° C. to 2° C. The temperature is raised to about 20-25° C. and the reaction mixture is stirred for, e.g., about 15-20 hours. Dichloromethane is distilled and the slurry is filtered to obtain the compound of formula Ia.

In another preferred embodiment, the compound of formula IV is reacted with triflic anhydride in the presence of 2-chloropyridine in dichloromethane at −15° C. to 5° C. under stirring for, e.g., about 1-2 hours. More preferably, the reaction mixture is stirred for about 1-3 hour. To the reaction mixture, ammonia in isopropyl alcohol is added at −15° C. to 5° C., preferably, at −10° C. to 0° C. The temperature is raised, for example to about 20-25° C., and the reaction mixture is stirred for, e.g., about 8-12 hours. Dichloromethane is distilled and the slurry is filtered. The solid cake can be washed with IPA followed by water to obtain the compound of formula Ia.

In an embodiment, the present invention provides a compound of formula Ia. In some embodiments, the compound of formula Ia has an HPLC purity of greater than 98%, e.g., greater than 99%, greater than 99.2%, greater than 99.4% or greater than 99.6%.

In an embodiment, the compound of formula Ia is converted to the compound of formula V.

In one embodiment, the process comprises a step for the preparation of a compound of formula Ib, Formula Ib

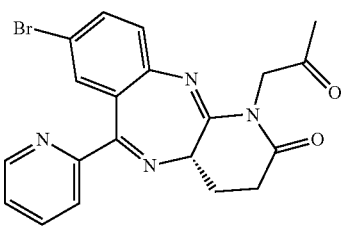

In an embodiment, the compound of formula Ib is prepared by reacting the compound of formula Ia, with a compound of formula III, Formula III

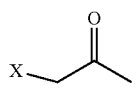

wherein X=Cl, Br, I, or OH.

In a preferred embodiment, the compound of formula Ia is reacted with a compound of formula III (wherein X=Cl).

In an embodiment, the compound of formula Ia is reacted with a compound of formula III (wherein X=Cl) in the presence of a base selected from the group consisting of potassium carbonate, sodium carbonate, lithium carbonate, cesium carbonate, triethyl amine, diisopropylethylamine, 1,8-diazabicyclo(5.4.0) undec-7-ene (DBU) and mixtures thereof. Preferably, the base is potassium carbonate.

In a preferred embodiment, the reaction is carried out in the presence of a solvent selected from the group consisting of dimethylformamide, acetone, dimethyl sulfoxide, methyl ethyl ketone, acetonitrile, ethyl acetate, methyl acetate, propyl acetate and mixtures thereof. Preferably, the solvent is dimethylformamide or acetone.

The reaction may be carried out in presence of a catalyst. The catalyst may be selected from potassium iodide and t-butylammonium iodide.

In a preferred embodiment, the compound of formula Ia is reacted with the compound of formula III (wherein X=Cl) in dimethylformamide in presence of potassium carbonate under stirring for, e.g., about 10-15 hours. More preferably, the reaction is carried out in presence of a catalytic amount of potassium iodide. The reaction is carried out at a temperature range of 0 to 15° C., preferably 0° C. to 10° C., more preferably at 0 to 5° C. The reaction mixture is stirred for, e.g., about 12-13 hours and then diluted with water. The product is extracted in ethyl acetate and the organic layer is distilled under vacuum to obtain compound of formula Ib.

In another preferred embodiment, the compound of formula Ia is reacted with compound of formula III (wherein X=Cl) in acetone in presence of potassium carbonate under stirring for, e.g., about 4-5 minutes. More preferably, the reaction is carried out in presence of a catalytic amount of potassium iodide. The reaction is carried out at a temperature range of 20° C. to 30° C., preferably at 25° C. to 30° C. The reaction mixture is stirred for, e.g., 12-14 h at 25-30° C., and the resulting product is isolated by isopropanol to obtain compound of formula Ib.

In an embodiment, the present invention provides a compound of formula Ib. In some embodiments, the compound of formula Ib has an HPLC purity of greater than 98%, e.g., greater than 99%, greater than 99.2%, greater than 99.4% or greater than 99.6%.

In an embodiment, the compound of formula Ib is converted to the compound of formula V.

In one embodiment, the process comprises a step of treating the compound of formula Ib with an acid in presence of methanol.

The acid may be selected from the group consisting of hydrochloric acid, hydrobromic acid, sulphuric acid, methane sulphonic acid, para-toluene sulphonic acid, benzene sulphonic acid and mixtures thereof, preferably hydrochloric acid.

In an embodiment, the acid may be generated in situ from an acid source.

The acid source may be selected from the group consisting of trimethylsilyl chloride, tetrabutyl ammonium chloride, tetrabutyl ammonium bromide, lithium chloride, ammonium chloride, ammonium bromide, ammonium sulphate and mixtures thereof.

Preferably, the compound of formula Ib is treated with trimethylsilyl chloride in presence of methanol.

In a preferred embodiment, the compound of formula Ib is treated with trimethylsilyl chloride in methanol under stirring for, e.g., 10 to 20 hours. Preferably, the reaction is carried out at a temperature range of –35° C. to 25° C., e.g., –35° C. to 15° C., –35° C. to 5° C., –30° C. to 0° C., or –25° C. to –5° C., more preferably the reaction mixture is stirred at –30° C. to –25° C. for, e.g., 16 to 17 hours. The temperature of the reaction mixture is raised to 20° C. to 25° C. and stirred for, e.g., about 13-14 hours. A saturated solution of sodium bicarbonate is added to the reaction mixture and the product is extracted in an organic solvent, such as dichloromethane. The organic layer can be distilled under vacuum to obtain the compound of formula V.

In an embodiment, the present invention provides a compound of formula V. In some embodiments, the compound of formula V has an HPLC purity of greater than 98%, e.g., greater than 99%, greater than 99.2%, greater than 99.4% or greater than 99.6%.

The compound of formula V obtained by the process of the present invention can be converted into the compound of formula VI by any of the methods known in the prior art, for example by using a process as reported in WO 2008/007071.

The inventors of the present invention have developed an improved process for the synthesis of Remimazolam. This highly efficient procedure of the present invention overcomes the disadvantages of the prior art processes.

The compounds of the present invention are prepared using inexpensive reagents without following any stringent reaction conditions.

The compounds are isolated readily without using column chromatography or difficult extraction steps. The intermediate compounds are stable and are converted into Remimazolam with ease, without following any critical process parameters. Simple work-up procedures such as precipitation, filtration, concentration, distillation and fewer extraction steps are employed and the compounds of formula I and formula V are isolated in high chemical and chiral purity as well as in high yields.

Thus, the process of the present invention is not only cost effective, but also is of high commercial value.

EXPERIMENTAL

Detailed experimental parameters according to the present invention are provided by the following examples, which are intended to be illustrative and not limiting of all possible embodiments of the invention.

Examples

Example—1

Preparation of(S)-8-bromo-6-(pyridin-2-yl)-1,3,4,4a-tetrahydro-2H-benzo[e]pyrido[3,2-b][1,4]diazepin-2-one (Formula Ia)

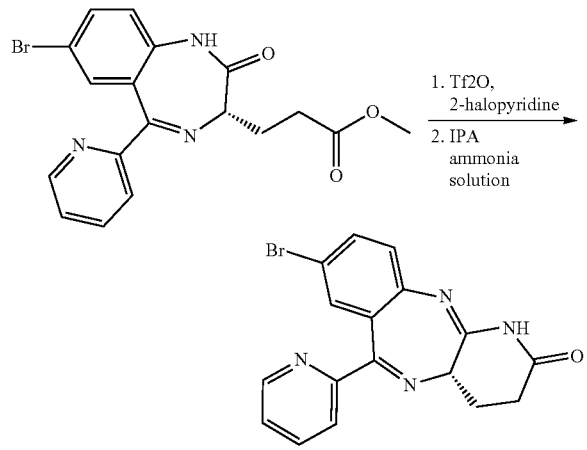

wherein halo=bromo or chloro

Method—1

To a solution of methyl(S)-3-(7-bromo-2-oxo-5-(pyridin-2-yl)-2,3-dihydro-1H-benzo[e][1,4]diazepin-3-yl) propanoate (10 g) & 2-Bromopyridine (7.86 g) in dichloromethane (70 ml), triflic anhydride (10.52 g) was added at −15 to ~10° C. The reaction mixture was stirred for 1 to 1.5 h at −15 to ~10° C. To this was added a 2M (100 ml) solution of ammonia in isopropyl alcohol at −10 to 2° C. & the reaction mixture was stirred for 15-20 h at 20-25° C. Dichloromethane was distilled under vacuum at 25-30° C. and water (10 ml) was added to the obtained slurry. The slurry was stirred at 20-25° C. for 2 h. The slurry was filtered and washed with IPA (20 ml). The solid was dried under vacuum below 40° C. for 5-6 h to obtain(S)-8-bromo-6-(pyridin-2-yl)-1,3,4,4a-tetrahydro-2H-benzo[e]pyrido[3,2-b][1,4]diazepin-2-one (7.6 g).

Yield: 82%; HPLC Purity: 99.13%

Method—2

To a solution of methyl(S)-3-(7-bromo-2-oxo-5-(pyridin-2-yl)-2,3-dihydro-1H-benzo[e] [1,4]diazepin-3-yl) propanoate (100.0 g) in DCM (500 ml), 2-chloro pyridine (56.5 g) was added at 20-25° C. The reaction mixture was cooled to −10 to 0° C. and triflic anhydride (84.2 g) was added to the reaction mixture in 30-45 minutes. The reaction mixture was stirred at −10 to 0° C. for 90-120 minutes. IPA (500 mL) was added to the reaction mixture and Ammonia gas (100-150 g) was purged into it for 4-6 h at −10 to 0° C. under stirring. The temperature was raised to 20-25° C. over a period of 4-6 h and the reaction mixture was stirred for 8-12 h. The reaction mixture was partially distilled below 30° C. while leaving ~100-300 mL in the reaction mixture. IPA (500 mL) was again added, and the resulting mixture was stirred for 2-3 h at 20-30° C. The slurry was filtered, and the obtained solid cake was washed with IPA (200 ml). The solid cake was dried for 60-80 minutes. Dried solid cake was added to water (600 ml) and the resulting mixture was stirred for 2-3 h at 20-30° C. and the slurry was filtered. The cake was washed with water (200 mL) and dried. The cake was washed with IPA (200 mL) and further dried under vacuum for 8-10 h at 40-45° C. to furnish(S)-8-bromo-6-(pyridin-2-yl)-1,3,4,4a-tetrahydro-2H-benzo[e]pyrido[3,2-b][1,4]diazepin-2-one (77 g)

Yield: 83%; HPLC Purity: 99.50%

Example—2

Preparation of(S)-8-bromo-1-(2-oxopropyl)-6-(pyridin-2-yl)-1,3,4,4a-tetrahydro-2H-benzo[e]pyrido[3,2-b][1,4]diazepin-2-one (Formula Ib)

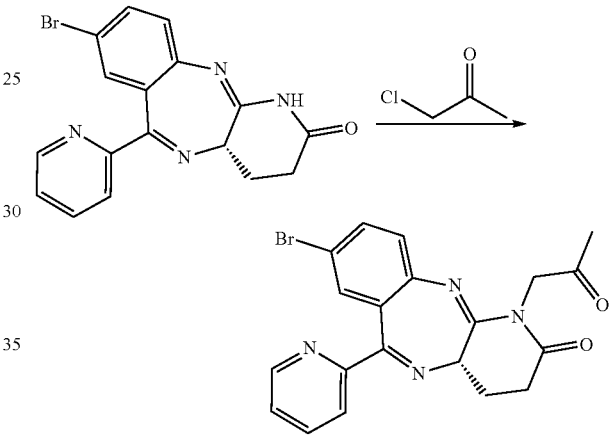

Method—1

Chloroacetone (4.81 g) and potassium iodide (1.35 g) was added in a mixture of(S)-8-bromo-6-(pyridin-2-yl)-1,3,4,4a-tetrahydro-2H-benzo[e]pyrido[3,2-b][1,4]diazepin-2-one (12 g) and potassium carbonate (7.19 g) in dimethylformamide (420 ml) subsequently at 0-5° C. The reaction mixture was stirred for 12-13 h at 0-5° C. The reaction mixture was diluted with water and the product was extracted with ethyl acetate. The combined organic layer was washed with water and the organic layer was distilled under vacuum to get the residue. Isopropyl alcohol was added in the residue and stirred for 15-20 min at 30-35° C. The solid was filtered and washed with isopropyl alcohol. The solid was dried under vacuum below 40° C. to obtain (S)-8-bromo-1-(2-oxopropyl)-6-(pyridin-2-yl)-1,3,4,4a-tetrahydro-2H-benzo[e]pyrido[3,2-b][1,4]diazepin-2-one (11.7 g).

Yield: 85.0%; HPLC Purity: 99.56%

Method—2

To(S)-8-bromo-6-(pyridin-2-yl)-1,3,4,4a-tetrahydro-2H-benzo[e]pyrido[3,2-b][1,4]diazepin-2-one (100 g) in acetone (1000 mL) at 20-30° C., potassium carbonate (74.86 g) was added. The mixture was stirred for 4-5 minutes and chloroacetone (50.12 g) was added at 20-30° C. Potassium iodide (11.24 g) was added to reaction mixture and the temperature was maintained at 25-30° C.

The reaction mixture was stirred for 12-14 h at 25-30° C. and filtered. The solid was washed with acetone (300 mL) and the filtrates were combined. The combined filtrates were evaporated under vacuum below 30° C. while leaving ~100-200 mL in the reaction mixture. IPA (1000 mL) was added to the residue and evaporated under vacuum below 35° C. while leaving ~400-500 mL in the reaction mixture. IPA (200 mL) was again added, and the temperature of reaction mixture was maintained at 20-30° C. The resulting mixture was stirred for 60-90 minutes. and cooled to 5-15° C. and further stirred for 60-90 minutes. The slurry was filtered and the obtained solid was washed with IPA (200 mL) and dried. Water (500 mL) was added to a reactor and the dried solid was added to it at 20-30° C. The resulting slurry was stirred for 90-120 minutes at 20-30° C. and filtered. The solid was washed with water (200 mL) and dried under vacuum at 40-45° C. for 8-10 h to furnish the (S)-8-bromo-1-(2-oxopropyl)-6-(pyridin-2-yl)-1,3,4,4a-tetrahydro-2H-benzo[e]pyrido[3,2-b][1,4]diazepin-2-one (95 g).

Yield: 82.5%; HPLC Purity: 99.56%

Example—3

Preparation of methyl 3-((4S)-8-bromo-1-methyl-6-(pyridin-2-yl)-4H-benzo[f]imidazo[1,2-a][1,4]diazepin-4-yl) propanoate (Formula V)

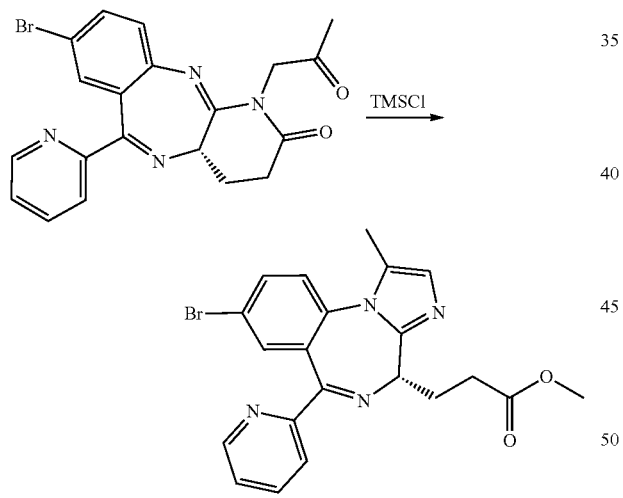

Method—1

(S)-8-bromo-1-(2-oxopropyl)-6-(pyridin-2-yl)-1,3,4,4a-tetrahydro-2H-benzo[e]pyrido[3,2-b][1,4]diazepin-2-one (2 g) was treated with trimethylsilyl chloride (8.17 g) in MeOH (20 ml) at −30 to −25° C. The reaction mixture was stirred at −30 to −25° C. for 16-17 h, the temperature was raised up to 20-25° C. and stirred for 13-14 h at the same temperature. A saturated solution of sodium bicarbonate is added to the reaction mixture at 10 to 15° C. and the product was extracted with dichloromethane. The organic layer was washed with water and was distilled under vacuum to obtain methyl 3-((4S)-8-bromo-1-methyl-6-(pyridin-2-yl)-4H-benzo[f]imidazo[1,2-a][1,4]diazepin-4-yl) propanoate (2.0 g).

Yield: 97.0%; HPLC Purity: 99.29%

Method—2

(S)-8-bromo-1-(2-oxopropyl)-6-(pyridin-2-yl)-1,3,4,4a-tetrahydro-2H-benzo[e]pyrido[3,2-b][1,4]diazepin-2-one was charged in MeOH (800 mL) at 20-30° C. and then cooled to −20 to ~15° C. To this Trimethylsilyl chloride (306.55 g) was added at −20 to ~10° C. and stirred for 3-4 h. The mixture was heated to 20-30° C. over a period of 1-2 h and stirred for 7-8 h. The reaction mixture was distilled under vacuum below 35° C. while leaving ~150 mL in the reaction mixture. DCM (500 ml) was added, and the reaction mixture was cooled to 0-10° C. Aqueous solution of sodium carbonate (99.68 g Sodium carbonate in 800 mL water) was added to the reaction mixture at 0-10° C. and was stirred for 20-30 minutes. The mixture was allowed to stand for layer separation. The organic layer was collected and aqueous solution of sodium carbonate (49.84 g sodium carbonate in 400 ml water) was added at 0-10° C. and stirred for 20-30 minutes. The mixture was allowed to stand for layer separations. The organic layer was collected and washed with water (500 mL) to give methyl 3-((4S)-8-bromo-1-methyl-6-(pyridin-2-yl)-4H-benzo[f]imidazo[1,2-a][1,4]diazepin-4-yl) propanoate.

The invention claimed is:

1. A process for the preparation of a compound of formula V or a salt thereof,

Formula V

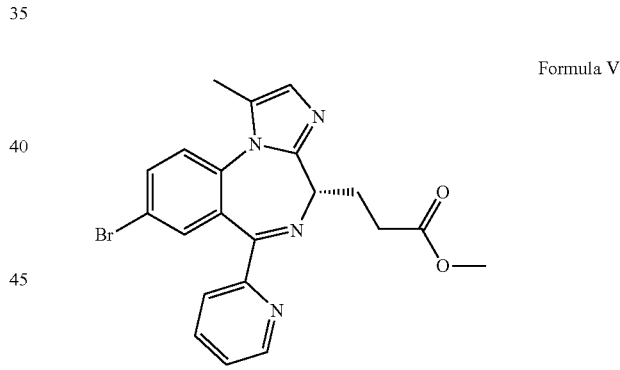

the process comprising the steps of a) reacting a compound of formula IV,

Formula IV

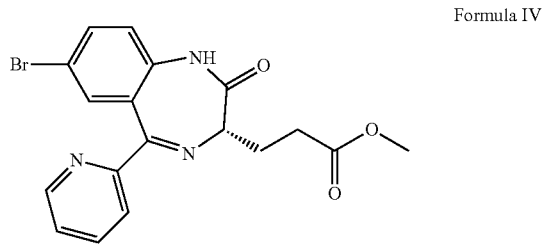 [SMILES: COC(=O)CC[C@@H]1N=C(c2ccccn2)c2cc(Br)ccc2NC1=O]

with a carbonyl group activating agent and adding an amination agent to obtain a compound of formula Ia,

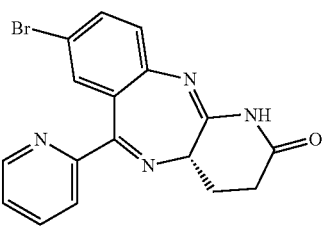

Formula Ia b) converting the compound of formula Ia to the compound of formula V or a salt thereof.

2. The process according to claim 1 for the preparation of the compound of formula V or a salt thereof,

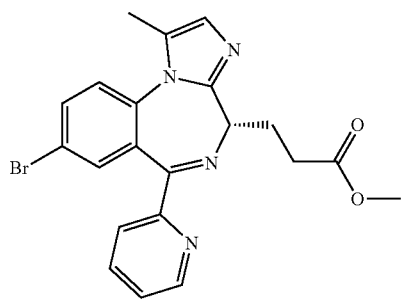

Formula V wherein the conversion step b) comprises the steps of:
a. reacting the compound of formula Ia,

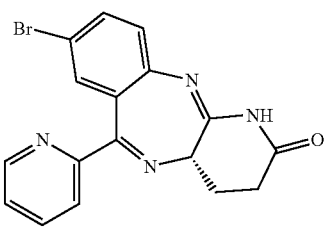

Formula Ia with a compound of formula III,

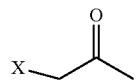

Formula III wherein X=Cl, Br, I, or OH to obtain a compound of formula Ib,

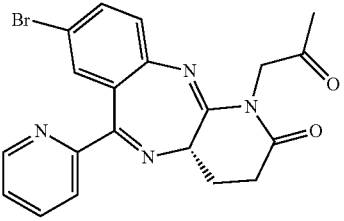

Formula Ib b. reacting the compound of formula Ib with an acid or an acid source in the presence of methanol to provide the compound of formula V or a salt thereof.

3. The process according to claim 1, wherein the carbonyl group activating agent is selected from the group consisting of triflic anhydride, methanesulphonic anhydride, p-toluenesulfonic anhydride, benzenesulphonic anhydride, methanesulfonyl chloride and p-toluenesulphonyl chloride.

4. The process according to claim 1, wherein the amination agent is selected from the group consisting of ammonia, ammonium hydroxide, ammonium chloride, ammonium bromide, ammonium iodide and ammonium carbonate.

5. The process according to claim 1, wherein the reaction of the compound of formula IV with the carbonyl group activating agent is done in the presence of a base selected from the group consisting of pyridine, 2-bromopyridine, 2-chloropyridine, 2,6-dibromopyridine, 2,6-dichloropyridine and mixtures thereof.

6. The process according to claim 1, wherein the reaction of the compound of formula IV with the carbonyl group activating agent is carried out in the presence of a solvent selected from the group consisting of dichloromethane, chloroform, acetonitrile, toluene, tetrahydrofuran and mixtures thereof.

7. The process according to claim 1, wherein addition of the amination agent is provided in a solvent selected from the group consisting of methanol, ethanol, isopropyl alcohol, tetrahydrofuran, dioxane and mixtures thereof.

8. The process according to claim 2, wherein the acid or the acid source is selected from the group consisting of hydrochloric acid, hydrobromic acid, sulphuric acid, methane sulphonic acid, para-toluene sulphonic acid, benzene sulphonic acid, trimethylsilyl chloride, tetrabutyl ammonium chloride, tetrabutyl ammonium bromide, lithium chloride, ammonium chloride, ammonium bromide, ammonium sulphate and mixtures thereof.

9. The process according to claim 2, wherein the reaction of the compound of formula Ia with the compound of formula III is carried out in the presence of a solvent selected from the group consisting of dimethylformamide, acetone, dimethyl sulfoxide, methyl ethyl ketone, acetonitrile, ethyl acetate, methyl acetate, propyl acetate and mixtures thereof.

10. The process according to claim 2, wherein the reaction of the compound of formula Ia with the compound of formula III is carried out in the presence of a base selected from the group consisting of potassium carbonate, sodium carbonate, lithium carbonate, cesium carbonate, triethyl amine, diisopropylethylamine, 1,8-diazabicyclo (5.4.0) undec-7-ene (DBU) and mixtures thereof.

11. The process according to claim 1 wherein the carbonyl group activating agent is triflic anhydride and the amination agent is ammonia and the converting is performed by reacting the compound of formula Ia with a compound of formula III, Formula III
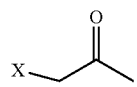
wherein X=Cl, Br, I, or OH
in the presence of a base to obtain a compound of formula Ib,
Formula Ib
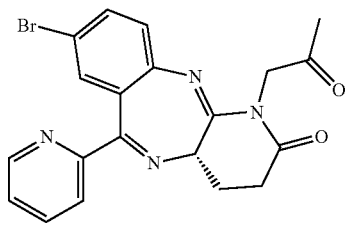
and treating the compound of formula Ib with trimethyl silyl chloride in methanol to obtain the compound of formula V or a salt thereof.
* * * * *